Figure 1:
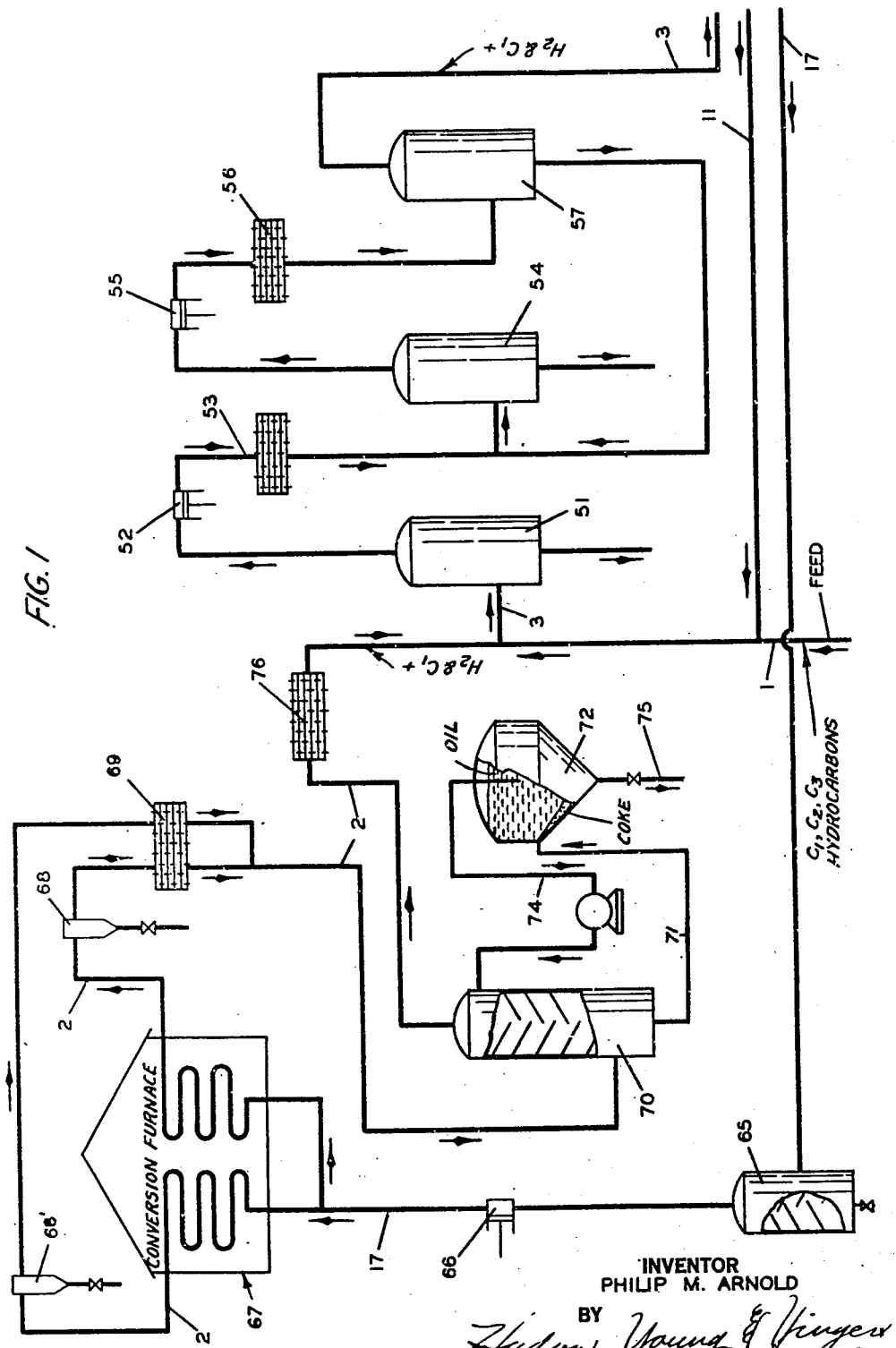

Oct. 4, 1949.    P. M. ARNOLD    2,483,869
TREATMENT OF HYDROCARBONS
Filed March 3, 1942                 2 Sheets-Sheet 1

INVENTOR
PHILIP M. ARNOLD
BY
Hudson, Young & Vinger
ATTORNEYS

INVENTOR
PHILIP M. ARNOLD
BY
Hudson, Young & Yinger
ATTORNEYS

Patented Oct. 4, 1949

2,483,869

UNITED STATES PATENT OFFICE 2,483,869

TREATMENT OF HYDROCARBONS

Philip M. Arnold, Bartlesville, Okla., assignor to Phillips Petroleum Company, a corporation of Delaware Application March 3, 1942, Serial No. 433,190

7 Claims. (Cl. 62—175.5)

This invention relates to a process for removing ethylene from admixture with other low boiling gases. In one of its more specific aspects this invention relates to a process for separation of ethylene from admixture with such gases as hydrogen, methane and other hydrocarbons higher boiling than ethylene. An object of my invention is to devise a process for the separation of ethylene from admixture with methane. Another object of my invention is to devise a process for separating ethylene from admixture with methane and hydrocarbons higher boiling than ethylene. Still another object of my invention is to devise a process for the separation of ethylene from admixture with hydrogen, methane and normally gaseous hydrocarbons higher boiling than ethylene. Yet another object of my invention is to provide a process for the separation of relatively low boiling hydrocarbon from admixture with one or more constituents in the gaseous state without the use of a closed methane refrigeration cycle. A further and important object is the separation of ethylene from hydrogen-methane mixtures containing ethylene by fractionation wherein a liquid methane reflux is obtained without the necessity of a closed methane refrigeration cycle. Additional objects will become apparent from the appended drawing when considered in conjunction with the ensuing description.

The present invention accomplishes a solution to the problem heretofore connected with the elimination of hydrogen and methane from hydrocarbon mixtures by the efficient utilization of properties of certain constituents of the hydrocarbon mixture in a manner to facilitate the extremely low temperatures necessary for the removal of hydrogen and methane from the mixture by fractionation. The invention also involves the employment of properties possessed by certain constituents of the effluent in a thermal conversion or other conversion process for the manufacture of butadiene, namely methane and ethylene, for effecting the efficient separation of ethylene from the methane and hydrogen, the recovery of butadiene and return of the ethylene to the conversion process for further production of butadiene. Specifically a refinery or other feed containing quantities of ethylene, hydrogen, methane and other hydrocarbons is combined with the effluent of the thermal conversion operation, recycle gases from the fractionation-separation stage of the process and the whole subjected to a series of compressive and cooling stages prior to introduction into an initial fractionating section. The mixture is partially liquefied and cooled by passage through the bottom of the initial fractionating section, where at the same time it furnishes the required heat for fractionation. It is further cooled to a low temperature before passing into the first fractionating section from which the bulk of the ethylene content is recovered. The bottom product removed from the first section is further processed for the recovery of ethylene which is, in a continuous process, liquefied, expanded adiabatically and passed in heat exchange relationship first with the overhead from the first fractionating section and then with the feed mixture to the first fractionating section to cool said mixture to a sufficiently low temperature to obtain satisfactory operation of said first fractionating section.

For securing the desired separation, it is necessary to produce a reflux composed of ethylene and methane in the first section which is maintained at a suitable superatmospheric pressure. The degree of cooling necessary to obtain an ethylene-methane reflux in the first fractionating section is a function of the pressure but it has been found that excessive pressures interfere with the fractionation. The cooling effected by the expanded ethylene on the overhead from the first section condenses a portion of ethylene and methane passing into the second fractionating section which is likewise maintained under superatmospheric pressure. On this section a reflux comprising principally methane is obtained for the separation of the remaining ethylene from the overhead of the first section by expanding a portion of the liquid condensate formed in and withdrawn from this second section and passing the same in heat exchange relationship with the overhead in said second section. A further portion of the liquid condensate is returned to the first section as reflux therefor. It is a noteworthy feature of this invention that following expansion of a portion of the liquid condensate utilized for refluxing principally methane, a phase separation occurs into methane and nearly pure ethylene liquid which is combined with the liquid ethylene recovered from the bottom product of the first fractionating section and expanded to successively cool the first section overhead and the initial feed mixture. The gas phase is recycled to the initial compression and cooling step. A propane or other type liquid refrigerant from an outside source is split into two streams, one of which is expanded and utilized to liquefy gaseous ethylene separated by fractionation from the effluent from the first fractionating section. The other stream is expanded and utilized for precooling the initial feed mixture prior to exchanging heat with the expanded ethylene stream. The propane streams are then recombined and returned for compression and recycling. The expanded ethylene stream including the ethylene recovered from the aforementioned phase separation after passing in heat exchange relationship with the overhead from the first fractionating section and the feed mixture is used to condense the reflux for a further fractionating tower in which the butadiene containing fraction is separated from lighter material, principally ethane, and for cooling the feed stream to that tower. The ethylene is thereafter compressed and fed into the cracking furnace to yield butadiene and other products.

Figure 2:
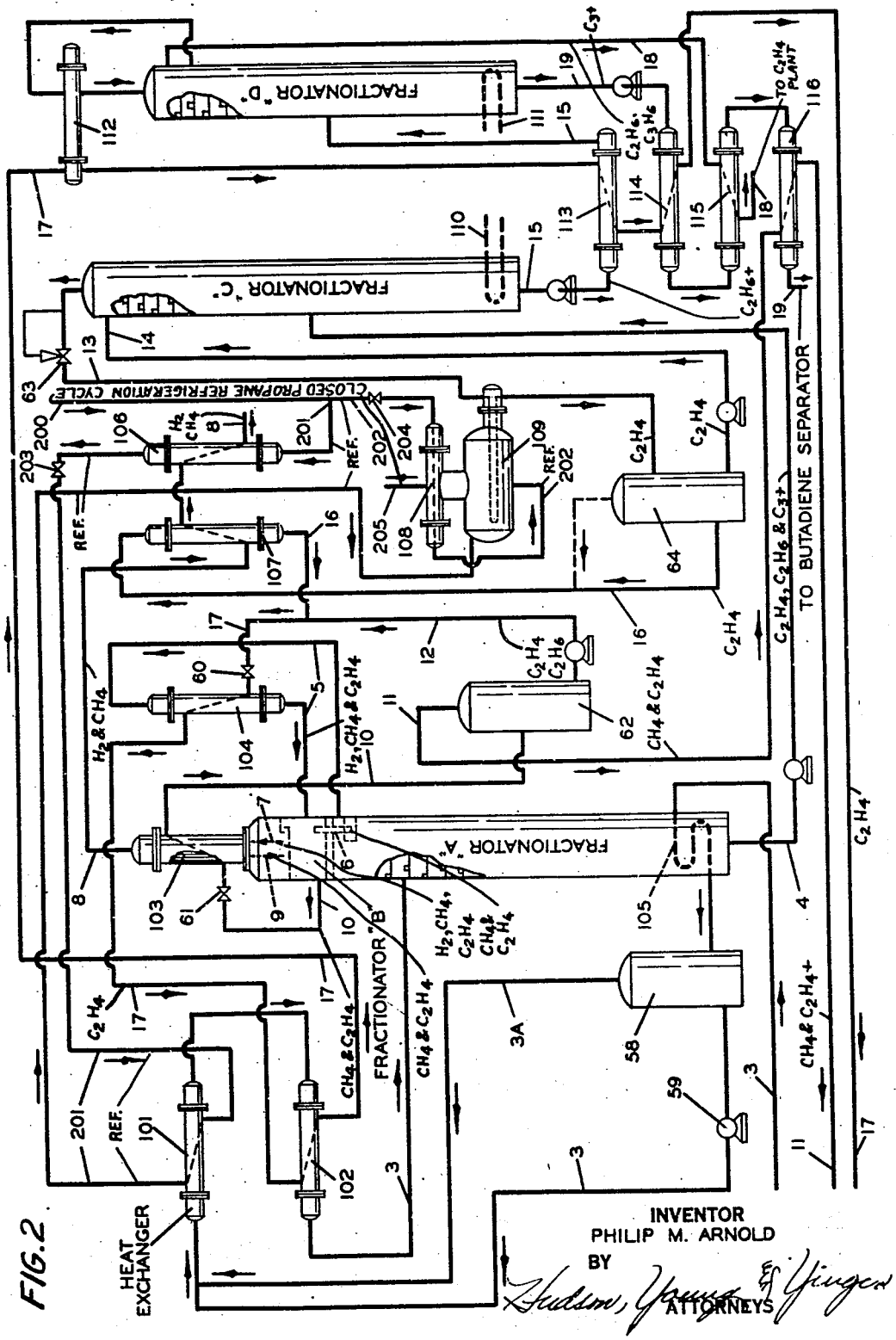

Figures 1 and 2 illustrate diagrammatically a flow diagram of apparatus which may be employed for carrying out the process of this invention.

Referring to Figures 1 and 2 a stream of gas containing ethylene obtained by any suitable means such as the conversion of propane, ethane or other hydrocarbon is fed into the system through a conduit 1 where it is combined with gases from a conduit 2 produced in the ethylene conversion step, and with recycled gases from a conduit 11. The composite stream is then fed into conduit 3 and passed through a compression system including separators 51, 54 and 57, compressors 52 and 55 and coolers 53 and 56 wherein it is compressed to about 300 pounds per square inch absolute and leaves the system deprived of tar, benzene and heavier material at a temperature of about 80° F. The stream is then led through a heat exchange coil 105 in the base of a first fractionating column or section A where it gives up heat to liquid in the column. The loss of heat reduces the temperature of the stream to about 15° F. and partially liquefies it which necessitates the use of a tank 58 for phase separation and a pump 59 for transfer of the liquid phase to the tubes of a heat exchanger 101. The gaseous phase passes to the heat exchanger through a conduit 3A and the combined stream cooled to a temperature of about −30° F. by heat exchange with expanded liquid propane which is in a closed propane refrigeration cycle, only shown in part. After passage through heat exchanger 101 the feed stream passes through heat exchanger 102 in which it is cooled to −74° F. by expanded ethylene from line 17 which is recovered from the bottom product of column A. The cooled composite feed stream is then passed into a first fractionating column or section A.

Fractionating column A is superimposed by a second and smaller column or section B. The greater part of the ethylene is removed from the stream to section A as overhead material. This section A is refluxed by a stream composed principally of ethylene and flowing down from fractionator B through a trap 6. The low temperature of the feed stream obtained by ethylene expansion facilitates the relatively low pressure, 300 pounds per square inch absolute, which is desirable for proper fractionation. The upper portion of section A which is at a temperature of about −87° F. condenses the greater part of the ethylene and heavier compounds and prevents them from passing with the overhead product in conduit 5 to the second fractionating section B. The lower portion of section A has a temperature of about −13° F. and removes methane and hydrogen from the ethylene and heavier materials, so that no appreciable quantity of these light materials leave the column kettle in conduit 4.

The overhead product from section A consisting principally of methane, ethylene and hydrogen passes through a conduit 5 and a heat exchanger 104 in which it is cooled to −130° F. partially condensing the gases and thereafter enters the second fractionating section B in which a phase separation takes place. Fractionating section B is likewise maintained under a pressure of about 300 pounds per square inch. The extremely low temperature in heat exchanger 104 is derived from expanded ethylene which with other hydrocarbons is withdrawn from section A through line 4, purified in fractionator C, passed through lines 13, 16 and 17 and expanded through valve 60. Following passage through the heat exchanger the partially vaporized ethylene is utilized for precooling the initial feed mixture for section A.

In fractionating section B a part of the liquid phase is returned through a gas trap 6 as reflux to the top of section A. Another portion of the liquid phase which consists primarily of ethylene and methane is passed through in a conduit 10 and expanded through a valve 61 to a pressure of about 20 pounds per square inch in the shell of a heat exchanger 103 producing a temperature of about −204° F. The gas phase in section B, indicated by an arrow, to which is attached reference numeral 7, rises through one or more bubble plates into the tubes of heat exchanger 103 and is partially condensed, thus producing a liquid condensate indicated by an arrow to which is attached reference numeral 9 and composed principally of methane for refluxing section B. By these means substantially all of the ethylene is removed from the methane and hydrogen stream which leaves the exchanger at a temperature of about −160° F. through conduit 8.

The portion of the liquid condensate from section B which is expanded through valve 61 passes through an overhead vapor condenser 103 thence through the conduit 10 to a separator 62. As a result of pressure reduction through the expansion valve 61 to 20 pounds per square inch, nearly pure liquid ethylene is separated from methane and ethylene vapor in separator 62 and pumped through conduit 12 to be combined with purified liquid ethylene separated from the bottoms of fractionating section A in a manner to be described hereinafter. The bottom product of section A at approximately −13° F. is pumped through conduit 4 to the middle of a fractionating column C which is for the purpose of separating substantially pure ethylene from ethane and heavier products. The ethylene leaves the top of column C at about −27° F. and through a back pressure regulator valve 63 adapted to maintain a pressure of about 300 pounds per square inch in the column. The gaseous ethylene at −27° F. is condensed to liquid ethylene at about the same temperature (−27° F. is approximately the boiling point of ethylene under 300 pounds pressure) in a heat exchange vessel 109 by liquid propane from the aforementioned closed refrigeration cycle and passes to accumulator 64 from which it is drawn through conduit 16 at 300 pounds per square inch and at −27° F. Reflux for column C is obtained by liquid ethylene pumped from accumulator 64 through line 14. Liquid ethylene passes through conduit 16 and heat exchanger 107 where it is cooled to −42° F. by heat exchange with overhead gases from section B composed of methane and hydrogen passing through conduit 8. It is then combined with the ethylene in line 12 from the phase separator 62, which collects expanded condensate from section B, and passes in conduit 17 through valve 60 where it is expanded into heat exchanger 104 at a pressure approaching atmospheric as above described.

The bottom of column C is maintained at about 80° F. by a hot water or steam coil 110 for the separation of ethylene from the ethane and heavier which are withdrawn in line 15, cooled to −25° F. in heat exchanger 113, and passed into column D in which a separation of ethane from the heavier material including butadiene is obtained. The bottom of column D is maintained at about 107° F. by a hot water or steam coil 111 and ethane at −5° F. is withdrawn as overhead product from the top of the column in line 18. The bottom product is withdrawn at 107° F. through line 19 and cooled to 52° F. by heat exchanger 114, to 28° F. in heat exchanger 115 and 2° F. in heat exchanger 116, thereupon being passed from the system through line 19 to a plant not shown for the separation of butadiene from heavier compounds.

The ethane in line 18 after its refrigeration capacity has been utilized in exchanger 115 for cooling the butadiene containing stream, is recycled through line 18 to the ethylene producing unit, not shown, or otherwise disposed of. The refrigerating capacity for heat exchanger 116 is obtained from gases comprising mainly methane which leave phase separator 62 at −160° F., pass through heat exchanger 116 and return through conduit 11 at 7° F. to be combined with thermal conversion effluent and initial ethylene feed to the compression system in Figure 1.

The liquid ethylene product from conduit 17 expands isenthalpically through valve 60 into the shell of heat exchanger 104. The expanded ethylene is passed from exchanger 104 at −150° F. into heat exchanger 102 to precool the initial feed mixture to section A thereby acquiring a temperature of −85° F. Thereafter, it is successively passed through line 17 into heat exchanger 112 to reflux a portion of the overhead product in column D, heat exchangers 113 at −45° F. and 114 at 32° to respectively precool the feed to column D and cool the butadiene stream for separation.

After its refrigerating capacity is thus fully utilized, the ethylene stream leaves heat exchanger 114 at 48° F. in line 17 and passes through scrubber 65, compressor 66, Figure 1, and into the two coil thermal conversion unit 67. The effluent from the conversion furnace leaves through conduits 2, 2 passes through tar separators 68′, 68 and is cooled in atmospheric heat exchanger 69. The effluent is then treated for carbon or coke removal in a separator in which oil is passed countercurrent with the gases over a series of baffles in a tank 70. Oil is removed in line 71 and passed into settling tank 72 for separation of the suspended carbon or coke. Clear oil from the unit 72 is pumped back to tank 70 through line 74. Residual material is removed from the tank 72 through line 75. The purified gaseous effluent is passed through cooler 76 and combined with ethylene containing feed from line 1 and recycle material in line 11 for feed to the compression system and fractionating process as heretofore described.

The closed propane refrigeration cycle so far as it is concerned with the present fractionating process operates as follows: liquid propane entering line 200 from a compression system, not shown, is split into two streams in conduits 201 and 202. Stream 201 passes at 80° F. through heat exchanger 106, and thence at 75° F. to control valve 203 through which it is expanded into heat exchanger 101 wherein it vaporizes in heat exchange with the initial feed stream 3 to the fractionating section A. The propane leaves exchanger 101 at −44° F. and passes to heat exchange tank 109. The second stream of propane liquid passes in conduit 202 at 80° F. through liquid control valve 204 and heat exchanger 108 to heat exchange tank 109 at 6° F. In tank 109 the liquid propane from line 202 comes in contact with gaseous propane at −44° F. from line 201 and itself vaporizes, the combined vapor passing upwardly through exchanger 108 and leaving the system through line 205 for recompression. The vapors in heat exchange tank 109 liquefy ethylene gases from column C as heretofore described.

The overhead product in line 8 from fractionating section B comprising methane and hydrogen at −160° F. has its refrigerating capacity utilized by passage through heat exchanger 107, becoming heated to −47° F. in precooling ethylene stream 16 to the expansion valve 60, and thereafter by passing through exchanger 106 to cool propane stream in conduit 201. The methane-hydrogen mixture then leaves the system at 60° F. through line 8 for any desired utilization.

Summary of operation

A gaseous feed stock containing ethylene and other gaseous hydrocarbons is combined with a recycle gaseous stream from a conversion furnace containing butadiene, ethylene and other gaseous hydrocarbons and the combined feed compressed to about 300 pounds per square inch absolute pressure. This compressed feed is then cooled and chilled to about −74° F. fractionated and the overhead product condensed and fractionated again to produce a bottom product of relatively pure liquid ethylene. Some of this liquid is vaporized and the vapors expanded in heat exchange relation with the overhead product of the second fractionation step to produce reflux for this same fractionation step. The expanded vapors pass to the thermal conversion step while the ethylene remaining as liquid is expanded isentropically for utilization in the refrigeration of feeds to the second fractionator and to the first fractionator. This latter gaseous ethylene is combined with the other ethylene stream for passage to the conversion furnace in which some butadiene along with other hydrocarbons is formed. These higher boiling hydrocarbons are fractionated from bottom of the first mentioned fractionation step.

The following Table I illustrates characteristics of the various streams and relative yields of materials based on a 24 hour run. All compositions and mol quantities are given on a pound mol basis.

Table I

|  | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
|  | Mols | Mols | Mols | Mols | Mols | Mols | Mols | Mols | Mols | Mols | Mols | Mols | Mols | Mols | Mols | Mols | Mols | Mols | Mols |
| $H_2$ |  | 414 | 417 |  | 420 | 3 | 416 | 414 | 2 | 3 | 3 |  |  |  |  |  |  |  |  |
| $CH_4$ | 801 | 277 | 1,372 | 21 | 1,677 | 326 | 1,296 | 1,048 | 248 | 303 | 294 | 9 | 49 | 28 |  | 21 | 30 |  |  |
| $C_2H_4$ | 1,525 | 5,501 | 7,197 | 6,722 | 968 | 493 | 113 | 17 | 96 | 458 | 171 | 287 | 15,537 | 8,832 | 17 | 6,705 | 6,992 | 17 |  |
| $C_2H_6$ | 961 | 161 | 1,128 | 1,102 | 54 | 28 | 4 |  | 4 | 26 | 6 | 20 | 70 | 40 | 1,072 | 30 | 50 | 1,062 | 10 |
| $C_3H_6$ | 336 | 99 | 435 | 435 |  |  |  |  |  |  |  |  |  |  | 435 |  |  | 118 | 317 |
| $C_3H_8$ | 197 | 11 | 208 | 208 |  |  |  |  |  |  |  |  |  |  | 208 |  |  | 25 | 193 |
| $C_4$ |  | 229 | 229 | 229 |  |  |  |  |  |  |  |  |  |  | 229 |  |  |  | 229 |
| $C_5+$ |  | 128 | 128 | 128 |  |  |  |  |  |  |  |  |  |  | 128 |  |  |  | 128 |
| Total/Day | 3,820 | 6,820 | 11,114 | 8,845 | 3,119 | 850 | 1,829 | 1,479 | 350 | 790 | 474 | 316 | 15,656 | 8,900 | 2,089 | 6,756 | 7,072 | 1,222 | 867 |

Referring to Table I, the stream numbers in the upper horizontal line correspond to the various conduits enumerated in the drawings. The lower horizontal line designates total mols passing the indicated localities on the basis of a day's run. For example the total feed to conduit 1 is 3,820 mols per day. Of this there are 801 mols of methane, 1525 mols of ethylene, 961 mols of ethane, 336 mols of propylene and 197 of propane. Examination of column 19 indicates a yield of 229 mols of C₄ hydrocarbons which includes a large percentage of butadiene. Tests have shown a yield of 10,500 pounds of butadiene per day.

The following table indicates the heat transfer per day, inlet and exit mol per cent vapor at each heat exchanger in the fractionating system.

Table II

| Heat Exchanger No. | Stream No. | Inlet, Mol Percent Vapor | Exit, Mol Percent Vapor | Heat Transferred 10⁶ B.t.u./Day |
|---|---|---|---|---|
| 101 | Propane | 0 | 100 | 26,647 |
|  | 3 | 86 | 52 |  |
| 102 | 3 | 52 | 12.7 | 24,127 |
|  | 17 | 0 | 100 |  |
| 103 | 10 | 0 | 60 | 1,685 |
|  | 8 | 100 | 100 |  |
| 104 | 17 | 0 | 0 | 7,070 |
|  | 5 | 100 | 59 |  |
| 105 | 3 | 100 | 86 | 14,971 |
|  | Kettle #1 | 0 | 0 |  |
| 106 | 8 | 100 | 100 | 1,304 |
|  | Propane | 0 | 0 |  |
| 107 | 8 | 100 | 100 | 1,594 |
|  | 16 | 0 | 0 |  |
| 108 | Propane, L | 0 | 0 | 19,160 |
|  | Propane, V | 100 | 100 |  |
| 109 | Propane | 0 | 100 | 65,550 |
|  | 13 | 100 | 0 |  |
| 110 | Steam Condensate | | | 68,106 |
|  | Kettle #2 | | | |
| 111 | Steam | | | 12,034 |
|  | Kettle #3 | | | |
| 112 | 17 | 100 | 100 | 2,570 |
|  | 18 | 100 | 79 |  |
| 113 | 17 | 100 | 100 | 4,975 |
|  | 15 | 0 | 0 |  |
| 114 | 17 | 100 | 100 | 1,350 |
|  | 19 | 0 | 0 |  |
| 115 | 16 | 100 | 100 | 0,572 |
|  | 19 | 0 | 0 |  |
| 116 | 11 | 100 | 100 | 0,630 |
|  | 19 | 0 | 0 |  |

It is obvious that various changes may be made in the apparatus herein shown and described without departing from the present invention. The separation process may be employed for isolating acetylene, which presents a similar problem of separation from hydrogen and methane as ethylene, as well as other low boiling hydrocarbons by utilizing the principles of this invention.

I claim:

1. The process for separating ethylene from a mixture containing ethylene and methane and heavier hydrocarbons which comprises passing said mixture to a first fractionating zone maintained under superatmospheric pressure and at a temperature below the critical temperature of the mixture; withdrawing an overhead stream comprising methane and ethylene from said zone and passing said overhead stream to a second fractionating zone maintained under superatmospheric pressure and therein separating said overhead stream into a liquid condensate comprising mainly methane and ethylene and a gaseous overhead; refluxing said first zone with a portion of said liquid condensate and withdrawing the remaining portion of said liquid condensate from said second fractionating zone; expanding said remaining portion of condensate and passing the same into indirect heat exchange relationship with overhead from said second fractionating zone and thereby condensing from said last named overhead liquid methane as reflux for said second zone; refluxing said second zone with said liquid methane; withdrawing a bottom stream comprising ethylene and heavier hydrocarbons from the first fractionating zone and passing said stream to a third fractionating zone; separating ethylene from said stream in said third fractionating zone and removing said separated ethylene from said third zone and condensing same and subsequently expanding said condensed ethylene and passing the same in indirect heat exchange relation with the overhead stream from said first fractionating zone and thereby cooling said overhead from said first fractionating prior to its introduction to said second fractionating zone.

2. The process of separating a relatively low-boiling hydrocarbon from one or more constituents in a gaseous mixture which comprises passing said mixture to a first fractionating zone maintained under superatmospheric pressure and at a temperature below the critical temperature of said mixture; supplying liquid reflux, comprising said hydrocarbon and a lower-boiling constituent of said mixture, to said first zone; passing overhead from said first zone, comprising said hydrocarbon and a lower-boiling constituent, to a second fractionating zone maintained under superatmospheric pressure and therein fractionating said overhead into a liquid condensate consisting essentially of said hydrocarbon and said lower-boiling constituent and a gaseous overhead; expanding a portion of said liquid condensate from the second fractionating zone and passing same in indirect heat exchange relationship with the overhead from said second fractionating zone and thereby condensing from said overhead a liquid reflux, comprising said lower boiling constituent; refluxing said second zone with said last-named liquid reflux; withdrawing an overhead fraction comprising substantially said lower boiling constituent from the top of said second fractionating zone; employing the balance of said liquid condensate as said first-named liquid reflux; and withdrawing a bottom stream comprising said hydrocarbon from said first fractionating zone.

3. The process of recovering ethylene in concentrated form from a feed stream containing the same, together with methane which comprises introducing said feed stream into a first fractionating section at an intermediate point therein, removing from said first section a bottoms fraction containing the major part of the ethylene contained in the feed and an overhead fraction containing methane and ethylene, cooling said overhead fraction and introducing same to a second and separate fractionating section, separating in said second section a gas phase as an overhead and as a bottoms product a liquid condensate composed principally of ethylene and methane, refluxing the top of said first section with a portion of said condensate, expanding the balance of said condensate and passing same in indirect heat exchange with said gas phase and thereby condensing therefrom a liquid stream composed principally of methane and thereby removing substantially all of the ethylene from said gas phase, refluxing said second section with said liquid stream composed principally of methane, withdrawing the uncondensed portion of said gas phase, said uncondensed portion comprising principally methane, and recovering nearly pure ethylene from said bottoms product as the product of the process.

4. The process of recovering ethylene in concentrated form from a feed stream cotaining the same together with methane and hydrocarbons heavier than ethylene which comprises introducing said feed stream into a first fractionating section at an intermediate point therein, removing from said first section a bottoms fraction containing said hydrocarbons heavier than ethylene and the major part of the ethylene contained in the feed and an overhead fraction containing methane and ethylene, cooling said overhead fraction and introducing same to a second and separate fractionating section, separating in said second section a gas phase as an overhead and as a bottoms product a liquid condensate composed principally of ethylene and methane, refluxing the top of said first section with a portion of said condensate, expanding the balance of said condensate and passing same in indirect heat exchange with said gas phase and condensing therefrom a liquid stream composed principally of methane, refluxing said second section with said liquid stream composed principally of methane for removal of substantially all of the ethylene from said gas phase, withdrawing the uncondensed portion of said gas phase, said uncondensed portion comprising substantially methane and fractionating said bottoms fraction in a third and separate fractionating section to recover overhead nearly pure ethylene and a bottoms product comprising said heavier hydrocarbons.

5. The process of claim 4 wherein products produced by said expansion step are separated into a liquid phase of nearly pure ethylene and a gaseous phase containing methane, and said liquid phase is expanded and passed in indirect heat exchange with said overhead from said first section to cool the same to the proper temperature prior to introduction to said second section, and removing the expanded ethylene.

6. The process of claim 4 wherein products produced by said expansion step are separated into a liquid phase of nearly pure ethylene and a gaseous phase containing methane, ethylene recovered as overhead from said third section is condensed to give a second liquid phase of nearly pure ethylene, and said liquid phases of nearly pure ethylene are combined, expanded and passed in indirect heat exchange with said overhead from said first section to cool the same to the proper temperature prior to introduction to said second section, and removing the latter expanded ethylene as a product of the process.

7. The process of recovering ethylene in concentrated form from a feed stream containing hydrogen, methane, ethylene and heavier hydrocarbons which comprises passing said feed stream in heat exchange with expanded nearly pure ethylene prepared as hereinafter described and thereby cooling said feed stream to about −74° F., introducing the resulting cooled feed stream at about −74° F. into a first fractionating section at an intermediate point therein, operating said first section at a pressure of about 300 pounds per square inch absolute with a top temperature of about −87° F. and a bottom temperature of about −13° F., supplying to the top of said first section a liquid reflux comprised principally of ethylene and methane in approximately equimolecular proportions and prepared as hereinafter described, removing from said first section a bottoms fraction containing the major part of the ethylene contained in the feed together with substantially all of the heavier hydrocarbons contained in the feed, removing from said first section an overhead consisting principally of methane, ethylene and hydrogen, passing said overhead in heat exchange with said expanded ethylene before it passes to said first heat exchanging step and thereby cooling said overhead to about −130° F. and partially condensing the gases therein, introducing the resulting cooled material at about −130° F. into a second fractionating section, operating said second section at a pressure of about 300 pounds per square inch absolute with a top temperature of about −240° F., separating in said second section a gas phase as an overhead and as a bottoms product a liquid condensate composed principally of ethylene and methane, employing a portion of said condensate as said reflux supplied to the top of said first section, withdrawing said gas phase from said second section, expanding the balance of said condensate in indirect heat exchange with said gas phase and thereby condensing from said gas phase a liquid stream composed principally of methane and thereby removing substantially all of the ethylene from said gas phase, refluxing said second section with the resulting liquid stream, withdrawing from the system the gaseous stream composed essentially of methane and hydrogen left as a residue of said gas phase from said expanding step, passing the expanded condensate to a separating zone maintained at low pressure and there separating nearly pure liquid ethylene from a gaseous phase containing methane, introducing the bottoms product from said first section to a third fractionating section operated at about 300 pounds per square inch absolute and with a top temperature of about −27° F. and a bottom temperature of about 80° F., withdrawing from said third section an overhead of nearly pure ethylene, condensing said overhead, supplying a part of the resulting liquid condensate to the top of said third section as reflux therefor, combining the remainder of said resulting liquid condensate with said nearly pure liquid ethylene mentioned above, and expanding the resulting nearly pure liquid ethylene and passing same first in indirect heat exchange with said first-named overhead and then in indirect heat exchange with said feed stream, and thereafter withdrawing the expanded ethylene from the system as the product.

PHILIP M. ARNOLD.

REFERENCES CITED

The following references are of record in the file of this patent:

UNITED STATES PATENTS

| Number | Name | Date |
|---|---|---|
| 2,067,349 | Schuftan | Jan. 12, 1937 |
| 2,180,200 | De Baufre | Nov. 14, 1939 |
| 2,214,790 | Greenewalt | Sept. 17, 1940 |
| 2,240,925 | De Baufre | May 6, 1941 |

FOREIGN PATENTS

| Number | Country | Date |
|---|---|---|
| 15,049 | Great Britain | 1913 |
| 17,235 | Great Britain | 1912 |

Certificate of Correction

Patent No. 2,483,869 October 4, 1949

PHILIP M. ARNOLD

It is hereby certified that error appears in the printed specification of the above numbered patent requiring correction as follows:

Column 10, line 18, for "—240° F." read —*204° F.*;

and that the said Letters Patent should be read with this correction therein that the same may conform to the record of the case in the Patent Office.

Signed and sealed this 28th day of February, A. D. 1950.

[SEAL]

THOMAS F. MURPHY,
*Assistant Commissioner of Patents.*